July 28, 1936.  H. J. DILLON  2,048,926

VEHICLE

Filed July 24, 1933  6 Sheets-Sheet 1

INVENTOR.
Hugh Joseph Dillon
BY
George B. Ingersoll
ATTORNEY.

July 28, 1936. H. J. DILLON 2,048,926
VEHICLE
Filed July 24, 1933 6 Sheets-Sheet 2

INVENTOR.
Hugh Joseph Dillon
BY George B. Ingersoll
ATTORNEY.

Patented July 28, 1936

2,048,926

UNITED STATES PATENT OFFICE 2,048,926

VEHICLE

Hugh Joseph Dillon, Detroit, Mich.

Application July 24, 1933, Serial No. 681,851

15 Claims. (Cl. 180—22)

My invention relates to improvements in vehicles in which a frame member is operatively connected with a plurality of driving axles, each of which are driven by an individual engine supported on the frame member; and the objects of my improvement are, first, to provide a vehicle having a main supporting frame member extending longitudinally of and at the approximate longitudinal center of the vehicle; second, to provide a vehicle having axle units together with a main frame member having transversely extending members located approximately at the load application point of the axle units; third, to provide a vehicle frame having a single main longitudinal member; fourth, to provide a vehicle having storage tanks mounted at the outer sides of a main longitudinal frame member located in the approximate longitudinal center of the vehicle; fifth, to provide a vehicle provided with a pair of driving axles each driven by a separate or individual engine or power plant and power transmission mechanism; sixth, to provide a vehicle having driving axles provided with different gear ratios; seventh, to provide a vehicle having a pair of independently controlled engines operating at different speeds; eighth, to provide a vehicle having a pair of power units with a supporting main frame member therebetween; ninth, to provide a vehicle having engine and fender members supported directly on a frame member extending transversely relative to a single main frame member of the vehicle; tenth, to provide a vehicle with bumper member supported on a main frame member and braced by resilient mechanism; eleventh, to provide a vehicle having adjustment means to provide different vehicle wheel bases; twelfth, to provide a vehicle with a plurality of control pedals or levers which can be optionally operated either individually or together; thirteenth, to provide a vehicle with a pair of engines adapted to be controlled either individually or together; fourteenth, to provide a vehicle with a pair of independently operated engines together with a separate group of accessories and auxiliary units operatively and independently connected with one of the engines; and fifteenth, to provide a vehicle with a pair of engines each operatively connected with a separate driving axle, the vehicle being further provided with a free wheeling mechanism between one of the engines and its associated driving axle to permit its associated engine to be automatically relieved from driving its associated driving axle when the other of the engines has reached a predetermined speed of operation for driving its associated driving axle.

I attain these objects by mechanism illustrated in the accompanying drawings, in which—

Similar numerals refer to similar parts throughout the several views.

Figure 1:
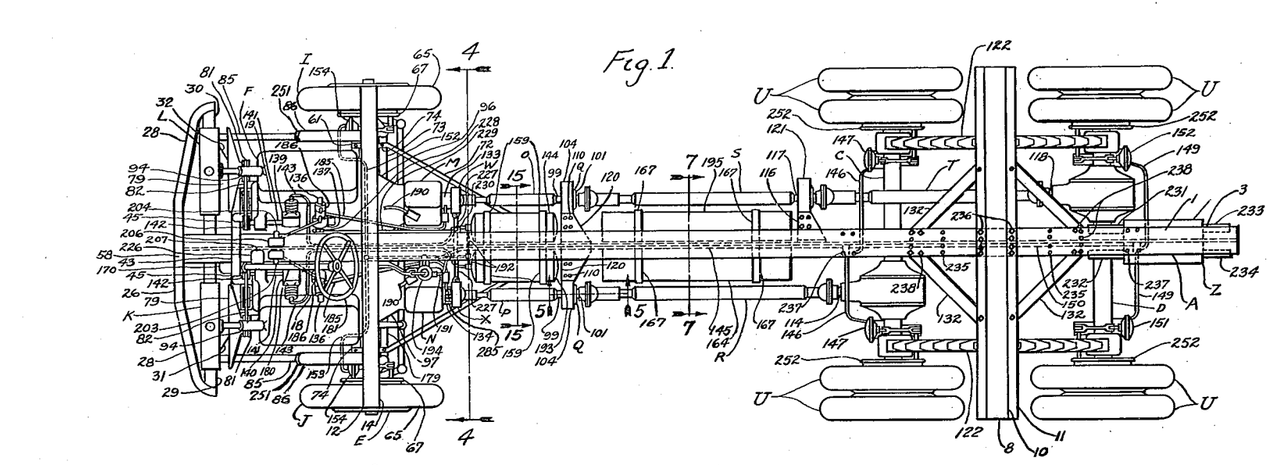
Figure 1 is a plan view of the vehicle drawn to disclose the total vehicle as an integral unit.
Figure 2:
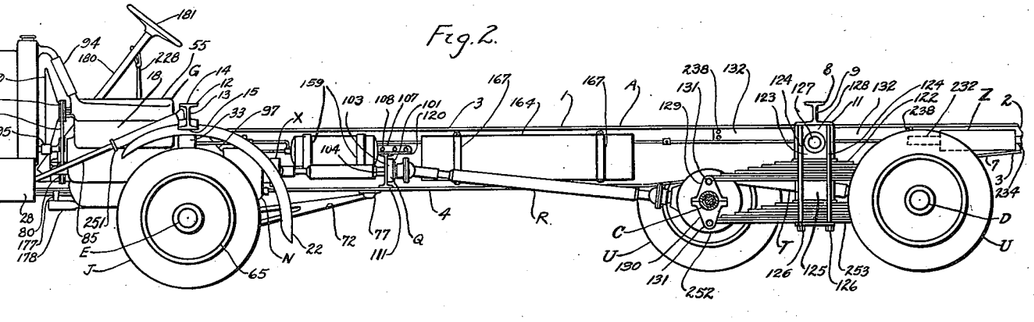
Fig. 2, a side view of the vehicle with one of its rear wheels and a portion of one of its driving axles removed.
Figures 3, 4, 6:
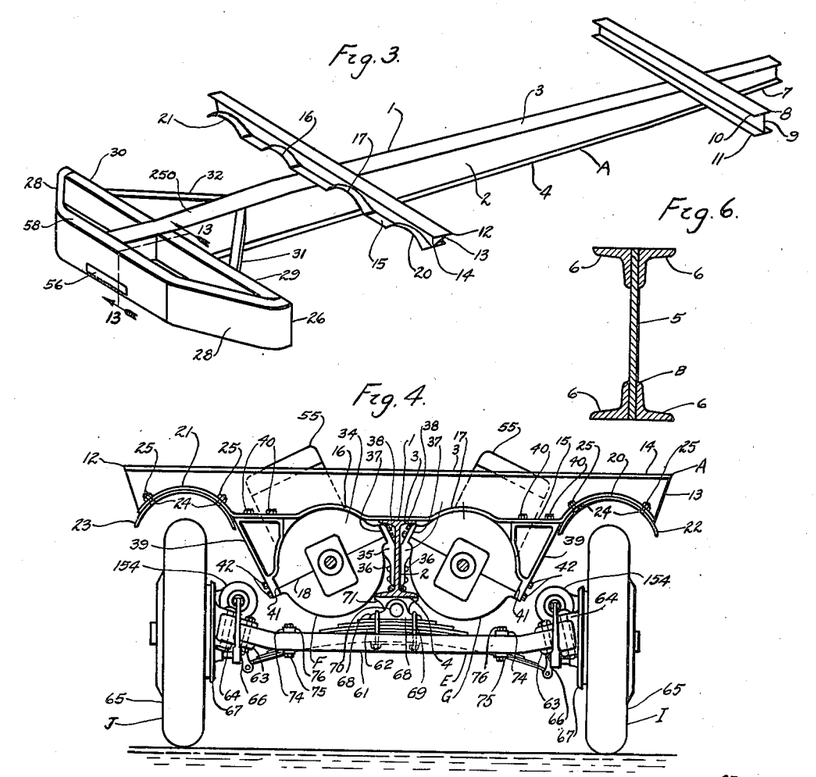
Fig. 3, a perspective view of the frame assembly.
Fig. 4, a sectional view of the vehicle on the line 4—4, Fig. 1.
Fig. 6, a sectional view of a fabricated main frame member.
Figure 5:
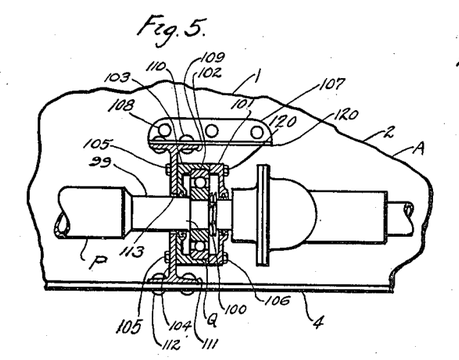
Fig. 5, a partial sectional view of one of the propeller shaft supports taken on the line 5—5, Fig. 1.
Figure 7:
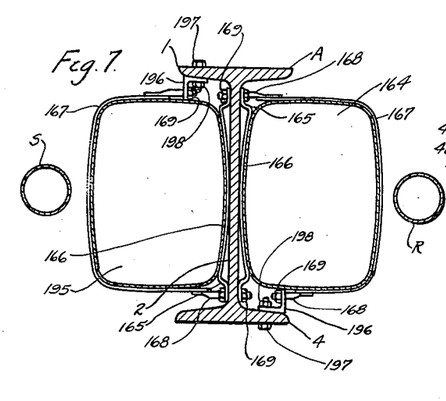
Fig. 7, a sectional view of the fuel storage tanks taken on the line 7—7, Fig. 1.

The vehicle is provided with the frame assembly A which is located so that the main frame member 1 extends longitudinally along the center or approximate longitudinal center of the vehicle and may be constructed of rolled channel I beam section, as disclosed in Figs. 1, 2, 3, 4, and 5 with a main vertical web 2 and the integral flanges 3 and 4 extending transversely therefrom at the top and bottom of the frame member 1, or if desired, the frame member 1 may be fabricated from a single vertical plate or member 5 and the angle members 6 secured thereto, as by welding or other similar or suitable means, to form a fabricated I beam section member assembly B of the desired strength and rigidity, as disclosed in Fig. 6.

It is to be noted that the web 2 together with the flange 4 may be formed and arranged to provide the frame member 1 with a tapered section, as disclosed for instance at 7, Figs. 2 and 3 to form a main frame member 1 of the desired strength, the mass of material being thus distributed and located to provide the greatest strength at the point or points of maximum stress.

The frame assembly A is provided with the rear cross member 8 which may also be provided with the vertical web 9 and the flanges 10 and 11 extending therefrom and may be secured to the flange 3 of the frame member 1 by welding, riveting, or other suitable or similar means, or by bolting as hereinafter disclosed, the rear cross member 8 being preferably located directly over the center of rear axle assemblies C and D. The front cross member 12 may also be provided with the vertical web 13 and the upper and lower flanges 14 and 15 extending therefrom and may be secured to the flange 3 of the frame member 1 by welding, riveting, or other suitable or similar means, the front cross member 12 being preferably located directly over the center of the front axle assembly E. The front cross member 12 may extend outwardly from the frame member 1 sufficiently to extend to approximately the outside portions of a cab and body structure which may be installed on the frame assembly A.

Also the lower flange 15 of the frame cross member 12 is provided with the curved, radial, spherical, or depressed surfaces 16 and 17 for receiving and engaging similar surfaces on the housings 18 and 19 of the engine assemblies F and G as hereinafter disclosed.

Also the frame cross member 12 may be further provided with the curved, radial, spherical, or depressed surfaces 20 and 21 for receiving and engaging the fenders 22 and 23 which may be secured thereto by the bolts 24 and nuts 25 or by other or similar means.

It is to be noted that with the location of the front cross member 12 and the rear cross member 8 located directly over the load centers of the axle units, the main frame member 1 will be relieved of excessive load carrying stresses and will be approximately uniformly loaded due to the distribution of the load thereon. This may be further accomplished by making the side members of the body unit, to be installed on the frame assembly A with suitable sections and sizes to carry the load in the body unit with approximately no deflection therein to reinforce and stiffen the frame assembly A when the body unit is secured thereto and to impose the body load directly on to the frame cross members 12 and 8.

The main frame member 1 may be tapered on its upper side as 250 to provide a better and more economical distribution of material to withstand load stresses, in a manner similar to the tapered portion 7 at the rear of the frame member 1 and also to permit the frame member 1 to blend into and conform with the desired size of the bumper member 26 with which the frame assembly A is provided, the bumper member 26 being suitably secured to the front portion of the frame member 1, said bumper member 26 being provided with the angularly positioned or rearwardly inclined portions 28 which may be so located as to conform with the shape or outline of the cab unit which is disclosed and claimed in my application for United States patent for Vehicle cab, Serial No. 681,850, filed July 24, 1933, Patent No. 1,995,501, dated March 26, 1935.

The rearwardly inclined portions 28 of the bumper 26 are connected at their rear extremities with the members 29 and 30 which extend to and are suitably connected with the frame cross member 1 as by welding or other suitable means. The frame assembly A may be further provided with the members 31 and 32 which extend rearwardly from the members 29 and 30 and diagonally with the frame member 1, the members 31 and 32 being suitably connected with the members 29 and 30 and the frame member 1 by welding or other suitable means.

The housings 18 and 19 of the engine assemblies F and G are provided with curved, radial, spherical, surfaces on the bell housings 33 and 34 which engage and fit with the similar surfaces 16 and 17 of the frame cross member 12 and are supported therein by the inner brackets 35 which are suitably secured by the rivets 36 or by welding or similar means to the web 2 of the main frame member 1, said inner brackets 35 being further secured to the inner supporting arms or portions 37 of the engine or bell housings 33 and 34, by the bolts or screws 38.

The housings 18 and 19 of the engine assemblies F and G are further supported in the curved surfaces 16 and 17 of the front cross member 12 by the outer support brackets 39 which may be secured to the lower flange 15 of the front cross member 12 by the bolts or screws 40, the outer support brackets 39 being further secured to the outer supporting arms or portions 41 of the engine or bell housings 33 and 34 by the bolts or screws 42. It is to be noted that the engine assemblies F and G are thus located and mounted on each outer side of the main or central frame member 1 and each of said engine assemblies F and G are rendered readily removable from their mountings without lifting over the usual side rails of a conventional frame assembly in which a pair of side rails are located at the extreme outer sides of a frame assembly, the removal of the bolts 38 and 42 together with the bolts 40 permitting the ready removal of the outer support brackets 39 and the engine assemblies F and G.

Figure 10:
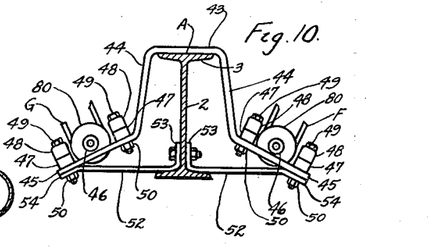
Fig. 10, a vertical sectional view through the front engine supports and the main frame member.

The engine assemblies F and G are further supported at their front portions by the bracket member 43, which, if desired, may be constructed in one piece and straddle mounted over the main frame member 1, as disclosed in Fig. 10, the bracket member 43 being suitably secured, as by welding or other suitable or similar means, to the flange 3, the bracket member 43 being provided with the downwardly extending portions 44 which are in turn provided with the portions 45 which may extend under the crankshaft extension 46 of the engine assemblies F and G to support the blocks or members 47, which may be constructed of resilient material, such as rubber composition or similar material, the blocks 47 engaging the lugs 48 which may be formed integrally with or suitably attached to the forward portions of the housings of the engine assemblies F and G, the portions 45, the blocks 47 and the lugs 48 being secured together by the bolts 49 and the nuts 50, which when removed permit the front portions of the engine assemblies F and G to be readily removed from their supported positions in a similar manner as above described relative to the rear support mechanism of the engine assemblies F and G. If desired, the brackets 52 may be used to support the portions 45 of the brackets 43, the brackets 52 being provided with the flange portions 53 for attaching to the web 2, by bolts and nuts as disclosed or by welding or other suitable means, the brackets 52 being further provided with the portions 54 for connecting to the portions 45 of the brackets 43, the portions 54 being secured by welding or other suitable means to the portions 45, the bolts 49 being adapted to further extend through the portions 54.

It is to be noted that the engine assemblies F and G, by the above described mechanism, will be supported in angular positions relative to one another and to the main frame member 1, the engine assemblies F and G being herein disclosed as having their cylinder portions 55 supported approximately at an angle of thirty five degrees from a vertical line, the angle of inclination of the engine assemblies F and G being varied to suit various engines and vehicles.

It is to be noted that the above disclosed angular positions of the engine assemblies F and G will provide sufficient room or passage therebetween to permit the operator or driver of the vehicle to enter and pass, between the engine assemblies F and G, to a driver's seat within a cab enclosure which is disclosed and claimed in the above mentioned application for United States patent, Serial No. 681,850, for Vehicle cab.

Figure 13:
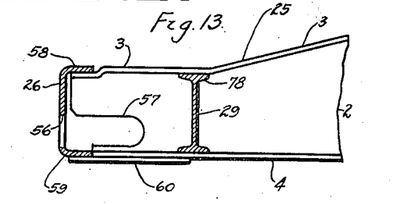
Fig. 13, a vertical view of the bumper and frame construction taken on the line 13—13, Fig. 3.
Figure 14:
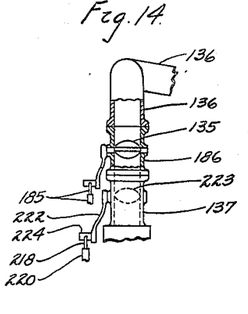
Fig. 14, a partial vertical section through the intake mechanism of one of the engine assemblies.

In order to facilitate the above described entrance to the operator to the space between the engine assemblies F and G of a vehicle, the bumper member 26 is provided with an opening 56 to provide a step for the operator, this construction being more fully disclosed in Fig. 13, the web 2 of the frame cross member 1 being cut away at 57 to provide sufficient room for the insertion of the operator's foot within and through the opening 56, the upper flange 3 of the frame member 1 being suitably formed to extend within and adjacent the upper flange 58 of the bumper member 26, the lower flange 59 of the bumper member 26 and the lower flange 4 of the frame member 1 being suitably connected by the plate or gusset member 60 which may be secured by welding other suitable means.

The front axle assembly E herein disclosed is of the type disclosed and claimed in my application for United States Letters Patent, Serial No. 681,849, filed on July 24, 1933 for Spring and axle construction, for vehicle, Patent No. 1,995,500, dated March 26, 1935, and comprises a pair of axle beam members 61 and 73 connected at their ends by the bracket members 63 on which are pivotally supported the spindle members 64 which operatively support the wheel assemblies I and J which are provided with the front wheels 65 and the brake drums 67.

The front spring 62 is located between the axle beam members 61 and 73 and extends transversely to the main frame member 1 and is connected to the bracket members 63 by the shackles 66.

The front spring 62 is connected at the spring seat 68 by the spring clips 69 and the spring seat 68 is pivotally mounted on the pin 70 which is suitably secured in the bracket 71 which is suitably secured to the lower flange 4 of the main frame member 1.

The torque member 72 is provided with the upper and lower flange portions 74 which are secured to the axle beam members 61 and 73 by the bolts 75 and the nuts 76.

The torque member 72 extends diagonally and rearwardly from the axle beam members 61 and 73 to a point below the lower flange 4 of the main frame member 1 to which it is pivotally connected by the bracket 77 which is suitably supported on the lower flange 4. The radiator assemblies K and L are mounted in upright and vertical positions at each side of the main frame member 1, at the center of the vehicle, and are suitably secured to the upper flanges 78 of the members 29 and 30, the radiator assemblies K and L being located, relative to the engine assemblies F and G, so as to be positioned adjacent to and slightly ahead of the fans 79 which are suitably connected with and operatively driven by the pulleys 80 which are suitably mounted on the crankshaft extension 46, the pulleys 80 and the pulleys 81 of the fans 79 being operatively connected by the belts 82. The radiator assemblies K and L are suitably connected at their upper portions with the cylinder portions 55 by the flexible hoses 94 and at their lower portions with the lower portions of the engine assemblies F and G with the flexible hoses 95.

Figures 8, 9, 11, 12:
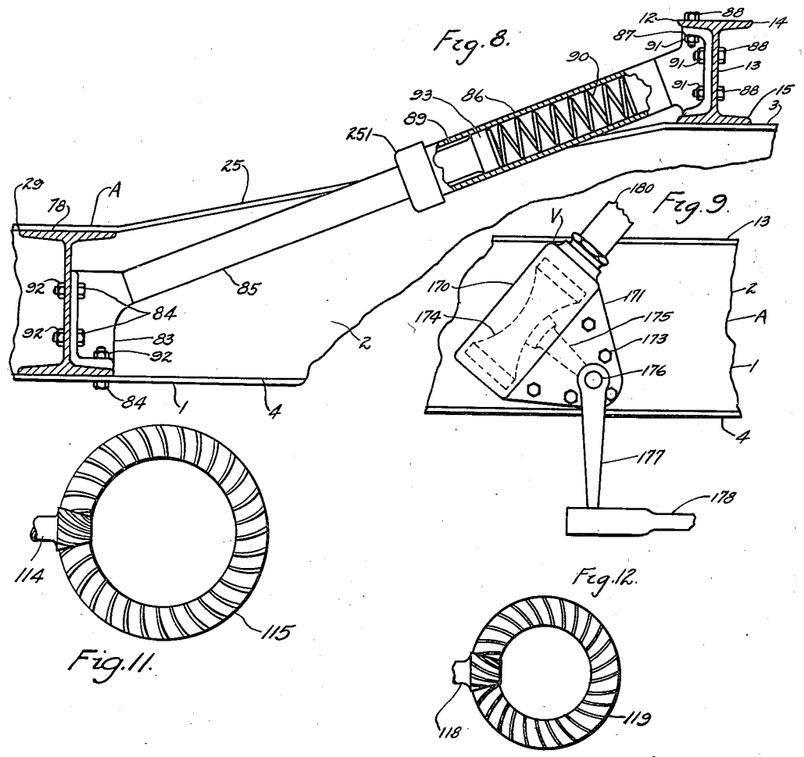
Fig. 8, a side and partial sectional view of one of the brace units connecting the front bumper with the front frame cross member.
Fig. 9, a side elevation disclosing the steering gear supported on the main frame member.
Fig. 11, a side view of the pinion and ring gear of the front driving axle assembly.
Fig. 12, a side view of the pinion and ring gear of the rear driving axle assembly.

To further support and brace the bumper member 26, the brackets 83 may be secured to the members 29 and 30 by the bolts 84 and nuts 92 or other suitable or similar means as disclosed in Fig. 8, the brackets 83 being provided with the extension members 85 which extend within the tubular members 86 which are provided with the brackets 87 which are secured to the web 13 of the front cross member 12 by the bolts 88 and nuts 91 or other suitable or similar means, the extension members 85 being provided with the ends 93 which are slidably mounted in the bores 89 of the tubular members 86 and engage the springs 90 which are mounted in the bores 89 in such manner to provide a resilient cushion to absorb thrust reactions of the members 29 and 30 when flexed by a thrust on the bumper member 26, thus allowing for a certain amount of flexibility in the frame assembly A when the bumper member 26 is collided with, thus confining the results of a collision to the front portions of the vehicle. The open end of the bores 89 of the tubular members 86 are closed by the cap members 251 through which extend the extension members 85, the cap members 251 being secured to the tubular members 86 as by threading or other suitable or similar means.

It is to be noted that my invention comprises two separate and independent engine or motor assemblies F and G, or power plants which are not operatively connected with each other through any form of power transmitting units such as transmissions, clutches, rear axles, etc. or through any accessories such as carburetors, throttle mechanism, etc., each engine or motor assembly or power plant separately and independently driving a driving axle assembly, both of said power plants being adapted to be operated together to simultaneously drive the vehicle. The engine assemblies F and G are respectively provided with the clutch housings 96 and 97 suitably supported therein and enclosing a suitable and conventional type of clutch mechanism which operatively connects the engine assemblies F and G with the transmission assemblies M and N, which are supported on the clutch housings 96.

The propeller shaft assemblies O and P are respectively operatively connected with and supported, at their front ends, on the transmission assembly M and N and are supported, at their rear ends on the bearing assemblies Q, the inner race 98 of which is mounted and secured on the extensions 99 of propeller shaft assemblies O and P by the nuts 100, the extensions 99 extending through the gland members 101 which also acts as a retainer for the outer race 102 of the bearing assembly Q which is thus retained in the housing 103 which, together with the gland member 101, are retained and secured on the frame member 104 by the bolts 105 and nuts 106, the frame member 104 extending outwardly from the main frame member 1 and being supported by the bracket members 120 which are provided at their inner ends with the flange portions 107 which are secured to the web 2 of the main frame member 1 by the rivets 108, the bracket members 120 being further attached to the upper flange 109 of the frame members 104 by the rivets 110, the lower flange 111 of the frame members 104 being secured to the flange 4 of the main frame member 1 by the rivets 112.

The frame members 104 are provided with openings 113 through which project the extensions 99 of the propeller shaft assemblies O and P. The bracket members 120 may be provided with a tapered shape, as disclosed in Fig. 1 to provide a more even distribution of metal to withstand stresses therein.

The propeller shaft assembly R is operatively connected with and supported at its front end, on the extension 99, of the propeller shaft assembly P and is operatively connected with and supported, at its rear end, on the pinion shaft 114 which is suitably mounted in the front driving axle assembly C and operatively engages the ring gear 115 of the front driving axle assembly C.

The propeller shaft assembly S is operatively connected with and supported, at its front end, on the extension 99 of the propeller shaft assembly O and is operatively connected with and supported in one of the bearing support assemblies Q which is mounted on and connected with the bracket member 116 and the frame member 121 in a manner similar to that disclosed relative to the bracket members 120 and the frame members 104.

The propeller shaft assembly T is operatively connected with and supported, at its front end, on the extension 117 of the propeller shaft assembly S and is operatively connected with and supported, at its rear end, on the pinion shaft 118 which is suitably mounted in the rear driving axle assembly D and operatively engages the ring gear 119 of the rear driving axle assembly D.

The rear driving axle assemblies C and D are each provided with a conventional type of differential mechanism operatively connected with the ring gears 115 and 119 which are suitably and respectively mounted in the differential casings, the rear driving axle assemblies C and D being provided with the wheel assemblies U and the brake drums 252 which are operatively driven by the ring gears 115 and 119.

The driving axle assemblies C and D are connected by the rear springs 253 and 122 which are suitably secured to the brackets 123 by the spring clips 124, the spacer members 125 and the nuts 126, the brackets 123 being pivotally mounted on the shafts 127 which are suitably secured in the brackets 128 which are in turn suitably secured to the rear frame cross member 8.

The rear springs 253 and 122 are pivotally connected to the brackets 129 and 130 by means of the pins 131 which are suitably secured in the brackets 129 and 130, the brackets 129 and 130 being suitably secured together around the housings of the driving axle assemblies C and D. The rear frame cross member 8 may be braced by the diagonal frame members 132 which may be secured at their outer ends to the rear frame cross member 8 and at their inner ends to the main frame cross member 1.

It is to be noted that the driving axle assemblies C and D will be pivotally mounted on the shaft 127 which will allow the driving axle assemblies C and D to oscillate about the shafts 127 and thus allow a free operating movement for the driving axle assemblies C and D.

It is also to be noted that the propeller assembly shaft assembly T will extend over the front driving axle assembly C with sufficient clearance to allow for the oscillating movement of the driving axle assembly C together with the oscillating movement of the propeller shaft assembly T as it moves wth the oscillating movement of the rear driving axle assembly D.

It is to be noted that the driving pinion 114 of the front driving axle assembly C will be provided with an identical number of teeth as the pinion gear 118 of the rear driving axle assembly C; and also the ring gear 115 of the front driving axle assembly C will be provided with a greater number of teeth than the ring gear 119 of the rear driving axle assembly D, the diameter of the ring gear 115, however, being greater than the diameter of the ring gear 119, this being clearly disclosed in Figures 11 and 12. The identical number of teeth in the above mentioned pinions and the different number of teeth in the ring gears will provide a slower axle driving ratio for the front driving axle assembly C than will be obtained by the driving pinion 118 and the ring gear 119 of the rear driving axle assembly D.

It is also to be noted that to operate the vehicle in my invention with the different rear axle ratios, as above disclosed, the engine assemblies F and G will be governed to revolve at different speeds. The road speed, however, of the rear driving axles C and D and the vehicle will be the same, each engine assembly F and G applying different torque to the rear driving axle mechanisms because of the different ratios in each of the rear driving axle mechanisms as above described.

It is to be understod that the fast and slow ratio mechanisms of the two driving axle assemblies may be located as above described with the fast axle ratio mechanism in the rear axle drive assembly or the faster axle ratio mechanism may be provided in the front driving axle assembly C and the slow ratio mechanism may be located in the rear driving axle assembly D. With the driving axle mechanism as above described, the engine assembly G will be governed to operate at a lower speed than the engine assembly F to compensate for the difference in the ratio mechanisms of the driving axle assemblies C and D.

It will thus be seen that the driving power of the engine assemblies F and G will be transmitted through gear mechanism in the transmission assemblies M and N so that either one of the two engine assemblies F and G may be selectively operated to propel the vehicle or both of the engine assemblies F and G may be operated collectively to propel the vehicle.

Thus with my invention one engine assembly only may be used to propel the vehicle when it is on level roadways, while both engine assemblies may be used together to propel the engines when maximum driving power is needed because of heavy loads, bad roadways, or highway grades, etc.

It will thus be seen that my invention will provide a means of conserving fuel or gasoline, or other fuels used to operate the engines by permitting the simultaneous driving operation of both of the axle assemblies F and G only when they are both needed for heavy or maximum pulling conditions.

It is to be noted that the engine assemblies F and G will be operated entirely separate from one another and will not be synchronized to operate at the same speeds as has been the custom with dual engine vehicles heretofore.

In order to further permit the engine assemblies F and G to be operated entirely independent as regards any interconnected power transmitting devices or accessory control units, the transmission assemblies M and N are each provided with an automatically operated gear shift mechanism which may be of the standard or conventional design, the power control utilizing either vacuum or air and being controlled by conventional push button control mechanism, arranged so that each of the transmission assemblies M and N can be shifted independently or separately relative to each other and yet be operated simultaneously.

Also if desired the automatically operated gear shifting mechanism of the transmission assemblies M and N may be of the mechanically operated type, utilizing centrifugal control means for shifting the various gear members into mesh and in accordance with the predetermined speed of the vehicle, the flexible shaft control unit 190 being disclosed with control handle in Fig. 1, the clutch mechanism in such mechanism being located if desired in the rear portions of the transmission assemblies M and N in a conventional manner.

In order to further provide for the separate control of the engine assemblies F and G, the speed control governors 133 and 134 will be suitably mounted at the rear of the transmission assemblies M and N to operate the flexible shaft mechanism 185 or similar or suitably mounted members connecting the speed control governors 133 and 134 respectively with the governing throttle 135, which may be located in the housing 186 suitably connected with the intake manifolds 136 of the engine assemblies, and suitably connected between the carburetors 137 and the manifolds 136, the intake manifolds 136 being suitably located in a fore and aft direction relative to the cylinders 55 and also suitably located relative to the longitudinal center of the bores of the cylinders 55.

The flexible shafts or similarly connected mechanism 185 thus provide a driving connection between the control governors 133 and 134 and the governor throttles 135, the control governors 133 and 134 thus being controlled by the speed of the vehicle to further control the operation of the engine at the desired operating speed thus enabling one of the engine assemblies F or G to run idle if desired, while the other of the engine assemblies is still pulling at full power.

It is to be noted that the vehicle will be equipped with two independent air brake systems in which the air compressors 139 and 140 will be respectively and operatively mounted on the engine assemblies F and G, the compressors being suitably operated by means of the shafts 141 and the pulleys 142, the pulleys 142 being suitably driven by the belts 82. The air compressors 139 and 140 will be suitably connected by the pipes or tubing 143 with the air storage tanks 144 and 193, the air storage tanks 144 and 193 being further connected by the pipes 191 and 192 to the air control valve 194 which is suitably and further connected by the pipes or tubings 145 and 146 to the air diaphragms 147 which are suitably mounted on the rear driving axle assembly C and by suitable linkage further operate in a conventional manner, the suitably mounted brake mechanisms enclosed in the brake drums 252. The air control valve 194 is further connected by the pipes or tubings 145 and 149 to the air diaphragms 151 which are suitably and operatively mounted on the rear driving axle assembly D in a manner suitably adapted through suitable linkage and shaft members to operate brake mechanisms enclosed in the brake drums 252 in the rear driving axle assembly D. The air control valve 194 is of conventional construction and may be operated manually by suitable mechanism connected therewith and extended to positions adjacent the drum of the vehicle, said manually operated mechanism not being disclosed. The manual operation of the air control valve 194 operates, by means of conventional valve mechanism (not disclosed) to permit or prevent, at the option of the driver, the compressed air from the storage tanks 144 and 193 to flow through the pipes which connect it with the various air diaphragms which actuate the brake mechanisms of the driving axle assemblies.

The air control valve 194 is further suitably connected by means of the pipes or tubings 143, 152 and 153 to the air diaphragms 154 which are suitably and operatively mounted on the front axle assembly E and are suitably connected and adapted by links and shaft members to operate brake mechanisms enclosed within the brake drums 67 of the front axle assembly E.

It is thus to be seen that with both of the engines F and G operating simultaneously or with either one of the engines F and G in operation, brake applications may be made on all of the six wheels of the vehicle simultaneously.

Figure 15:
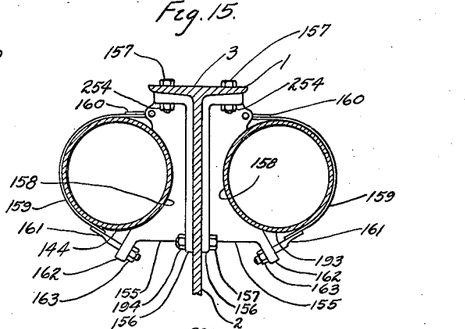
Fig. 15, a sectional view of the air compressor or storage tanks taken on the line 15—15, Fig. 1.

Figure 15 clearly discloses the method of supporting the air storage tanks 144 and 193, the air storage tanks 144 and 193 being supported on the brackets 155 which are provided with the flanges 156 which may be suitably secured to the web 2 and flange 3 of the main frame member 1 by the bolts 157 and nuts 254. The brackets 155 are provided with a radial surface 158 in which is fitted the air storage tanks 144 and 193, the air storage tanks 144 and 193 being secured on the seats 158 by the strap members 159 which are provided with the pivotally mounted ends 160 and the threaded members 161 at the other of its ends, the threaded members 161 being adapted to pass through the bosses 162 of the brackets 155, the threaded members 161 being secured by the nuts 163. It will thus be noted that the air storage tanks 144 and 193 will be compactly mounted in a protected position between the upper and lower flanges 3 and 4 of the main frame 1 and also between the vertical web 2 of the frame member 1 and the propeller shaft assemblies O and P.

Also the fuel tanks 164 and 195 may be mounted in a similar compact and protected manner by means of the bracket members 165 which are provided with the seats 166 for suitably engaging and fitting one of the sides of the fuel tanks 164 and 195 and being provided with the threaded ends 168 which extend through the brackets 165 and 196 and also through the web 2 of the main frame member 1, the threaded ends 168 being secured in position by the nuts 169, the brackets being secured by the bolts 197 and nuts 198.

The fuel tanks 164 and 195 and the air tanks 144 and 193 will be of such size and shape as to provide operating clearance relative to the propeller shaft assemblies O, P, R and S.

The steering gear assembly V as disclosed in Figure 9 will be provided with a housing 170 which will be provided with the flange 171 which may be suitably secured to the web 2 of the main frame member 1 by the bolts 173. The steering gear assembly V is provided with the conventional worm 174 and sector or lever member 175 which operates the chuck or cross shaft 176 and oscillates the steering arm 177 to actuate the steering drag link 178 which is suitably connected to the steering arm 179 of the front axle assembly E.

The steering gear assembly V is further provided with column 180 which is suitably connected to the steering wheel 181. It is to be noted that the steering gear assembly V may be mounted adjacent and on the main frame member 1, thus providing a more secure, substantial and convenient mounting for the steering gear assembly V, or it may be mounted when desired in the manner disclosed in Fig. 17.

It is to be noted that my invention of the six wheel vehicle as above disclosed will provide a three point suspension for the frame assembly A, the forward part of the frame assembly A being mounted above the center of the front spring 62 whereas the rear portion of the frame assembly A will be mounted above the spring members 253 and 122, thus providing a main load carrying member which is suspended below the frame members, which are operatively connected by the wheel members.

Figure 17:
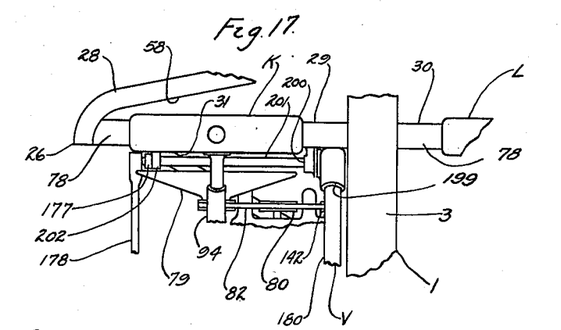
Fig. 17, a plan view of a portion of the frame assembly together with an alternative mounting of the steering gear when it is desired to extend the chuck or cross shaft of the steering gear toward the outside of the vehicle to carry or accommodate different operative connections with the steering arm of a front axle assembly.

If desired, the steering gear assembly V may be provided with the housing 199 which may be suitably supported in the bracket 200 which is suitably mounted on the member 29, the steering gear assembly V being further provided with the extended chuck or cross shaft 201 which may be suitably supported, adjacent its outer end, in the bracket 202, which may be suitably supported on the member 29. The extended cross shaft 201 will thus permit locating the steering arm 177 at a point sufficiently removed from the frame member 1 to enable the steering drag link 178 to be constructed without excessive bends to accommodate its operative connection with various designs and locations of steering arms 179 relative to the front axle assembly E.

Figure 16:
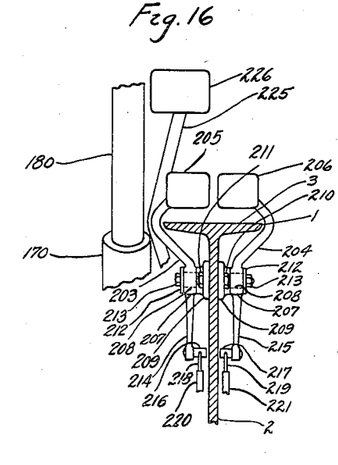
Fig. 16, a transverse sectional view of the main frame member and with the throttle control pedals or levers mounted thereon together with a portion of the pedal or lever for controlling the operation of the air brake system and a portion of the steering gear.

The pedal or lever members 203 and 204 are each provided with the pads 205 and 206 which are located adjacent one another and also are preferably located in alignment in a plane extending transversely relative to longitudinal center of the vehicle to permit the foot of the operator of the vehicle to be placed in an operative position separately on either of the pads 205 or 206 or on both of the pads 205 or 206 simultaneously, thus enabling the operator to optionally accelerate or decelerate one or both of the engine assemblies F and G to control the operation of the vehicle. The pedals 203 and 204 are each provided with the bosses or hubs 207 which engage and pivotally operate on the shaft portions 208 of the brackets 209 which may be secured to the web 2 of the main frame member 1 by the bolts 210 and nuts 211, the bosses 207 engaging and being retained by the washers 212 which are retained by the nuts 213 which may suitably engage the shaft portions 208 as by threading or similar means.

The pedals 203 and 204 are respectively provided with the arms 214 and 215 in which are rollably mounted the members 216 and 217 to which are suitably connected the flexible shafts 218 and 219 suitably mounted in the flexible conduits 220 and 221, the flexible shafts 218 and 219 being respectively connected with the levers 222 suitably mounted in the carbureters 137 of the engine assemblies F and G, and operatively connected with the fuel throttles 223 of the carbureters 137, the lever arms 222 each being provided with the rollably mounted members 224 for operatively connecting with the flexible shafts 218 and 219.

The pedal or lever member 225, provided with the pad 226 may be pivotally mounted on the main frame member 1 in a manner similar to the pedal or lever members 203 and 204 and is operatively connected with the air control valve 194 to permit manual control of the application of the air brakes in the brake system of the vehicle.

The transmission assemblies M and N are respectively provided with the propeller shaft brake assemblies W and X which may be operatively mounted in a conventional way on the transmission assemblies M and N and will be operatively connected together by a suitably mounted shaft 227, which may extend through the main frame member 1, and be further operatively connected with the brake lever 228 by the rod 229 and by suitable lever mechanism, the hub portion of which is indicated at 230, the brake lever 228 being suitably and operatively mounted on the main frame member 1, both of the propeller brake assemblies being capable of being operated simultaneously by the brake lever 228.

Figures 19, 20, 22:
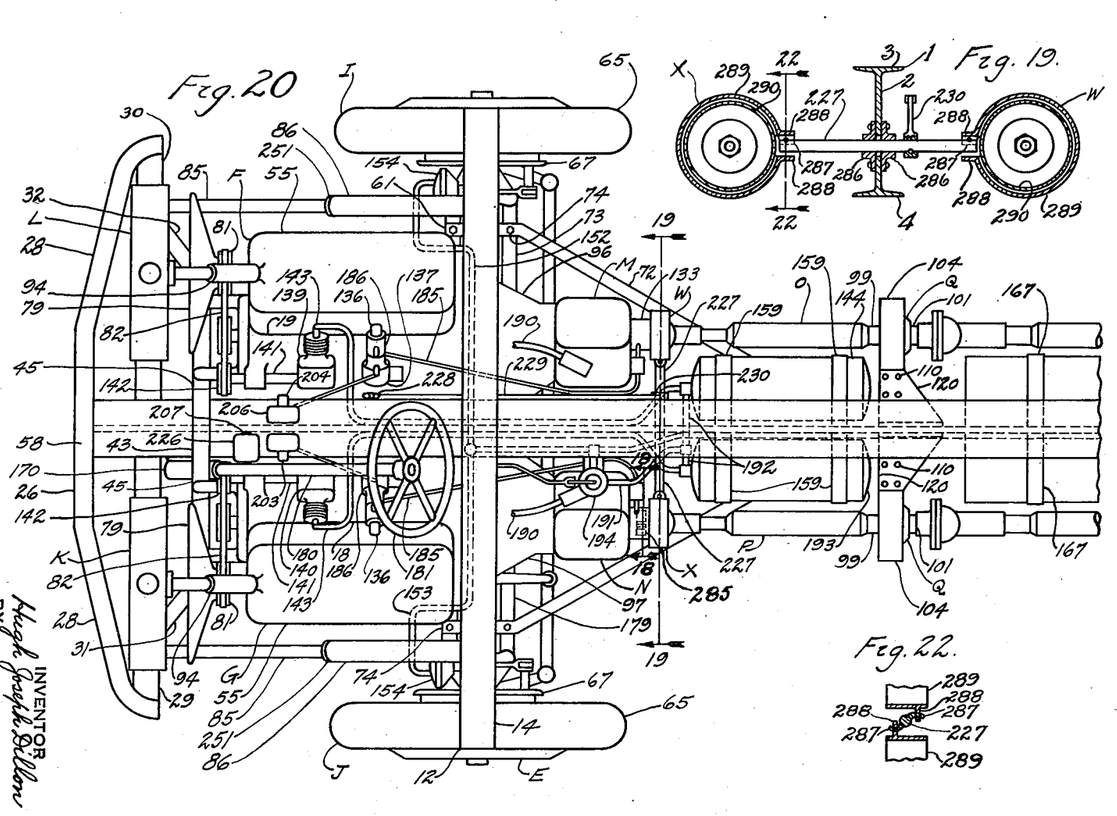
Fig. 19, a vertical section through the brake mechanism taken on the line 19—19, Fig. 20.
Fig. 20, a plan view of the front portion of the vehicle drawn to a larger scale than that disclosed in Fig. 1, to more clearly show the structure thereof.
Fig. 22, a partial sectional view of the brake mechanism disclosed in Fig. 19, said partial sectional view being taken on the line 22—22, Fig. 19.
Figure 21:
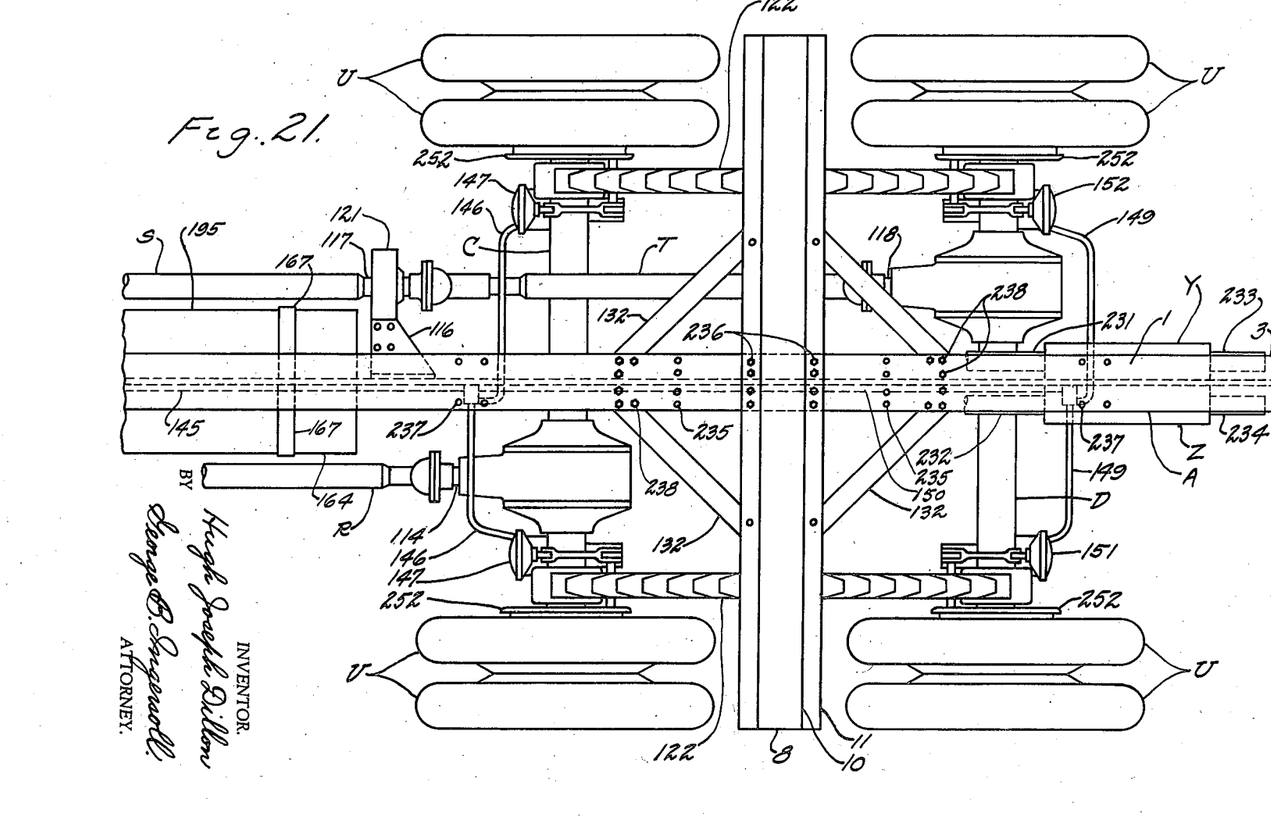
Fig. 21, a plan view of the rear portion of the vehicle disclosed in Fig. 1 drawn to a larger scale in order to more clearly show the structure thereof.

The shaft 227 is rotatably mounted in the brackets 286 which are attached to the main frame member 1 and is provided at its ends with the cam or lever portions 287 which engage the extension portions 288 at each end of the brake bands 289 which are suitably anchored and adapted to engage the brake drums 290 which are adapted to revolve with the propeller shaft assemblies O and P. The rotation of the shaft 227 will thus expand and control the brake bands 289 in accordance with the direction of rotation of the shaft 227.

The muffler assemblies Y and Z may be mounted at the rear end of the main frame member 1 and in a manner similar to that disclosed relative to the air tanks 144 and 193, the muffler assemblies Y and Z being mounted between the flanges 3 and 4 of the frame member 1 and are respectively connected, by the muffler pipes 231 and 232 with the exhaust portions of the engine assemblies F and G, the muffler assemblies Y and Z being respectively provided with the tail pipes 233 and 234. The use of commercial vehicles requires a great variation in the length of wheel bases and to permit my vehicle design to be readily and adjustably adapted to different lengths of wheel bases, the main frame member 1 may be provided with a series of holes 235 to permit the rear frame cross member 8 to be secured to the main frame member 1 by the bolts 236, the main frame member 1 being further provided with a series of holes 237 to permit the members 132 to be secured thereto by the bolts 238.

The manufacturer of the vehicle may thus ship the vehicle to dealers with the frame members 8 and 132 bolted, or secured by similar means, and if the vehicle is not thus provided with the proper wheel base for the particular requirements for which the dealers eventually sell the truck, the dealers may move the rear frame cross member, together with the members 132, to the proper location, as indicated by the series of holes 235 and 237, to meet the necessary wheel base requirements at which time the dealers may, if desired, further secure the frame members 8 and 132 in position by permanent means, such as rivets, welding, or similar means.

The series of holes 235 and 237 will usually be spaced in distances of six or twelve inches which correspond to the amount of variation usually found in wheel base lengths. It is thus to be noted that I have provided means whereby vehicle wheel bases may be varied by economical adjustment means to meet additional wheel base requirements by the ultimate purchaser, the proper length of propeller shafts being readily assembled in their operative positions in the vehicle to meet the requirements of the adjusted wheel bases.

It is also to be further noted that one only of the transmission assemblies M or N will be provided with a conventional free wheeling mechanism, the transmission assembly provided with said free wheeling mechanism being the one that is operatively connected with the driving axle assembly having the slow gear ratio mechanism, the transmission assembly N thus being, in the vehicle as disclosed, the one provided with said free wheeling mechanism.

It is thus to be noted that with one only of the transmission assemblies, namely N, thus being provided with a free wheeling mechanism and with the engine assembly F being governed to a predetermined maximum speed of operation, that when the vehicle has attained a predetermined road speed, the engine assembly G will be automatically relieved, by the free wheeling mechanism, from driving the driving axle assembly C, the engine assembly C then continuing to operate at an idling speed, the engine assembly F continuing to drive the driving axle assembly D and in turn the vehicle, until the road speed falls below a predetermined amount at which time the engine assembly G will again automatically resume its driving operation of the vehicle in conjunction with the engine assembly F. It is to be noted that my invention will thus provide means for utilizing automatically one or both of the engine assemblies F and G to most economically drive the vehicle according to the load and speed requirements of the vehicle.

Figure 18:
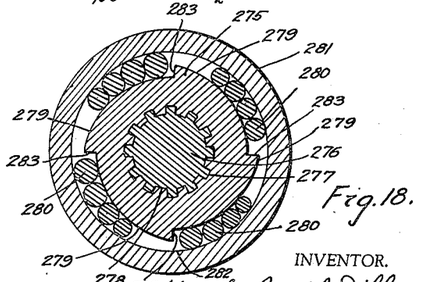
Fig. 18, a cross sectional view of the free wheeling mechanism taken on the line 18—18, Fig. 20.

Figure 18 discloses a cross section of the free-wheeling mechanism in a plane extending transversely to the axis thereof and discloses diagrammatically the operation of a conventional and free-wheeling mechanism.

It is to be understood that various types of free-wheeling mechanisms may be employed in my invention and the mechanism disclosed in Figure 18 is a sectional view of a conventional mechanism as used in various vehicles in the automotive field.

The free-wheeling mechanism as disclosed in Figure 18 is provided with the collar 275 which is mounted on the driven or main shaft 276 of the transmission assembly N, the collar 275 being provided with the spline grooves 277 which fit the splines 278 of the main shaft 276 and is thus driven by the main shaft 276, said conventional mechanism being disclosed in the Fig. 15, page 396, and described on page 395 of volume 26 of the S. A. E. Transactions for 1931, as published by the Society of Automotive Engineers, Incorporated, 29 West Thirty-ninth Street, New York, N. Y., said disclosure and description appearing in the article entitled "Free Wheeling" as written by Delmar G. Roos and William S. James. Also said free wheeling mechanism is indicated at 285 in Figs. 1 and 20.

The collar 275 is provided with the cam surfaces 279 which will be engaged by the series of rollers 280.

The collar 281 is operatively connected with the propeller shaft assembly P in such a way that the collar 281 becomes a driving member therefor. The collar 281 is provided with the bore 282 which is also engaged by the series of rollers 280.

It is to be noted that the cam surfaces 279 will be constructed so that the rollers 280 may be of diminishing size relative to the largest roller, the series of rollers thus forming a wedging contact with the surface of the bore 282 and the cam surfaces 279.

When power is being transmitted from the engine assembly G through the transmission assembly N and its operatively connected parts to the main shaft 276, the driving torque will be transmitted from the main shaft 276 through the collar 275 by means of the cam surfaces 279 engaging the series of rollers 280 with a wedging contact, which in turn wedges the series of rollers into a driving contact with the bore 282 of the collar 281, thus transmitting the driving torque through the propeller shaft assembly P and the other power transmission units operatively connected therewith so that the driving axle assembly C will propel the vehicle.

As soon as the speed of the vehicle attains a predetermined rate as dictated by the pre-determined maximum speed operation of the engine assembly F which is governed to a pre-determined maximum speed of operation, the engine assembly G will be automatically relieved by the free-wheeling mechanism from driving the driving axle assembly C due to the speed of the vehicle overrunning the speed of the engine assembly G, with the result that the driving axle C will impose a driving torque thrust through the propeller shaft assemblies R and P to the collar 281 in a reverse direction, which will allow the collar 281 to move sufficiently relative to the collar 275 to further allow the series of rollers 280 to move down the cam surfaces 279 and toward the shoulders 283, the series of rollers 280 thus being relieved of wedging driving contact relative to the surface of the bore 282 of the collar 281, this resulting in the free-wheeling operation of the driving axle C by means of the mechanism disclosed in Figure 18.

I claim:

1. In a vehicle provided with a frame assembly having a main frame member extending longitudinally at the longitudinal center of the vehicle together with frame cross members located substantially at the front and rear portions and an intermediate cross member therebetween, the combination of a pair of engine assemblies located on opposite sides of the main frame member and between the cross member at the front portion and the intermediate cross member of said frame assembly, supporting means securing the front portion of each of said engine assemblies to the main frame member of said frame assembly, a second supporting means securing the rear portion of each of said engine assemblies to the intermediate cross member of said frame assembly, a pair of driving axle assemblies located at opposite sides and operatively connected with the frame cross member located at the rear portion of said frame assembly, power transmission means operatively connecting each of said engine assemblies with one only of said driving axle assemblies, governing means for controlling the speed of each of said engine assemblies independently of the other of said engine assemblies, a free-wheeling mechanism operatively connected with one only of said power transmission means, and a steering axle assembly operatively connected with the main frame and intermediate cross members of said frame assembly.

2. In a vehicle, the combination of a pair of driving axle assemblies suitably mounted, each of said driving axle assemblies being provided with a driving mechanism having a different driving speed ratio than the other of said driving axle assemblies, a pair of engine assemblies suitably mounted, one of said engine assemblies only being operatively connected with one of said driving axles, a pair of transmission assemblies each operatively connected with one of said engine assemblies and one of said driving axle assemblies, a free wheeling mechanism operatively connected with said transmission operatively connected with the driving axle assembly having the driving gear mechanism of slowest driving speed ratio, and means for controlling each of said engine assemblies to operate at a different speed from the other of said engine assemblies.

3. In a vehicle having a frame assembly provided with a main frame member extending longitudinally at the longitudinal center of the vehicle, the combination of a plurality of axle assemblies operatively connected with the frame assembly and each provided with brake mechanisms, a pair of compressed air storage containers supported by and on opposite sides of said main frame member for containing compressed air for operating the brake mechanisms of said axle assemblies, a pair of engine assemblies supported by and on opposite sides of said main frame member, an air compressing means suitably mounted and operatively connected with each of said engine assemblies, each of said air compressing means being operated by one of said engine assemblies independently of the other of said air compressing means, each of said air compressing means being connected with both of said compressed air storage containers to maintain said storage containers full of compressed air, valve means for controlling the flow of the compressed air from said storage containers to the brake mechanisms of said axle assemblies, means for conducting the compressed air from said compressed air storage containers to said valve means and to the brake mechanisms of said axle assemblies, and power transmitting means operatively connecting each of said engine assemblies with one of said axle assemblies and extending adjacent the outer sides of said compressed air storage containers.

4. In a vehicle having a frame assembly provided with a main frame member extending longitudinally at the longitudinal center of the vehicle together with a pair of engine assemblies mounted on opposite sides of said main frame member, said frame member being provided with a vertical web together with flanges extending substantially at right angles therefrom, the combination a pair of brackets mounted on opposite sides of the vertical web of said main frame member, a fuel storage tank seated against each of said pair of brackets and operatively connected with said engine assemblies, said fuel storage tanks being located between the flanges of said main frame member, and means for securing each of said fuel tanks against one of said pair of brackets.

5. In a vehicle having a main frame member extending longitudinally at the longitudinal center of the vehicle and having a horizontally extending flange at its upper side, together with a pair of engines mounted on opposite sides of said main frame member and having fuel feed control means respectively and independently connected with each of said engines, the combination of a pair of accelerator members pivotally supported on and at opposite sides of said main frame member, the pivot support of said accelerator member being located below said horizontally extending flange of said main frame member, each of said accelerator members being operatively connected with the fuel feed control means of one of said engines, said accelerator members each having offset lever portions provided with foot pads, said offset lever portion extending around and above the edge portions of said horizontally extending flange of said main frame member, said foot pads being located adjacent one another above the horizontally extending flange of said main frame member, said foot pads permitting the optional operation of one or both of said accelerator members with a foot of the operator of the vehicle.

6. In a vehicle, the combination of a frame assembly comprising a main frame member extending longitudinally at the longitudinal center of the vehicle and provided with a vertical web having flanges, a pair of driving axles suitably connected with said frame member, a pair of engine assemblies suitably mounted on said frame assembly on opposite sides of said main frame member, power transmission means operatively connecting each of said engine assemblies with one only of said driving axles, and a pair of muffler assemblies suitably mounted on opposite sides of said main frame member at a point behind said driving axles, said muffler assembly being located adjacent the vertical web and between the flanges of said main frame member, each of said muffler assemblies being operatively connected with one only of said engine assemblies.

7. In a vehicle, the combination of a pair of driving axle assemblies suitably mounted, one of said driving axle assemblies being provided with a driving mechanism having a slower driving speed ratio than the other of said driving axle assemblies, a pair of engine assemblies suitably mounted and governed to operate at different rates of speed, power transmission means operatively connecting each of said engine assemblies with one only of said driving axle assemblies, and free wheeling mechanism suitably mounted and forming a portion of said power transmission means operatively connecting the driving axle assembly, provided with said driving mechanism having the slower driving speed ratio, with one of said engine assemblies to permit the engine assembly, operatively connected with the driving axle provided with the driving mechanism having the slower driving speed ratio, to operate without exerting a driving effort, relative to said driving axle assembly having a driving mechanism with a slower driving speed ratio, when the vehicle has attained a predetermined road speed.

8. In a vehicle having a frame assembly provided with a main frame member extending longitudinally at the longitudinal center of the vehicle, said main frame member being provided with a vertical web having flanges extending substantially at right angles therefrom, the combination of bracket members supported on and at opposite sides of the vertical web of said main frame member, said bracket members being provided with cylindrical surfaces, a pair of cylindrical storage tanks supported against the cylindrical surfaces of said bracket members located on opposite sides of said main frame member, said storage tanks being located between said flanges of said main frame member, and means for securing each of said cylindrical storage tanks in its supported position against said bracket members.

9. In a vehicle having a main frame member extending longitudinally at the longitudinal center of the vehicle together with a pair of engines supported on opposite sides of said main frame member and each provided with throttle means, the combination of a pair of brackets oppositely disposed about and secured to said main frame member, each of said brackets being provided with a shaft portion, lever members pivotally mounted on the shaft portions of said brackets and each provided with a pad extending above said main frame member, and means operatively connecting each of said lever members with the throttle means of one of said pair of engines.

10. In a vehicle having a main frame member extending longitudinally at the longitudinal center of the vehicle together with a pair of engines supported on opposite sides of said main frame member and each provided with throttle means, the combination of a pair of brackets secured to opposite sides of said main frame member and provided with shaft portions in alignment, and pedal levers pivotally mounted on each of the aligned shaft portions of said brackets, each of said pedal levers being operatively connected with the throttle means of one of said pair of engines.

11. In a vehicle having a pair of engines and a main frame member extending longitudinally therebetween at the longitudinal center of the vehicle, said main frame member being provided with a vertical web together with a horizontal flange at its uppermost portion, the combination of a pair of lever members extending adjacent the vertical web of said frame member and having offset portions to clear the horizontal flange of said main frame member, each of said lever members being provided with a pad at the uppermost end of its offset portion together with an arm adjacent the vertical web of said frame member, and means for operatively connecting each of said arms of said lever members with one of said engines to enable the operator of the vehicle to control the speed of the engines.

12. In a vehicle having a main frame member extending longitudinally at the longitudinal center of the vehicle, and provided with a vertical web together with flange portions extending on opposite sides at the upper portion of said vertical web, the combination of a pair of engines mounted on opposite sides of said main frame member, a pair of mufflers mounted on opposite sides of said main frame member, each of said mufflers being located adjacent the vertical web and below the flange portions of said main frame member, and conduit members connecting each of said mufflers with one of said engines, said conduit members extending adjacent the vertical web and below the flange portions of said main frame member.

13. In a vehicle provided with a main frame member, the combination of a pair of engines for driving the vehicle and located in parallel planes extending longitudinally of the vehicle, said engines being located in the same plane extending transversely of the vehicle, said engines being mounted adjacent the sides of said main frame member, a throttle mechanism operatively connected with each of said engines, and a pair of pedal members mounted adjacent one another and between said engines, said pedal members being supported on opposite sides of said main frame member, the adjacent portions of said pedal members being located above the upper surface of said main frame member, each of said pedal members being operatively connected with the throttle mechanism of one of said engine assemblies.

14. In a vehicle, the combination of a pair of driving axle assemblies each provided with a reduction gear mechanism together with a pair of driving wheel assemblies, said pair of driving axle assemblies being adapted to individually or collectively drive the vehicle, the reduction gear mechanism of one of said pair of driving axle assemblies having a slower driving speed ratio than the gear reduction mechanism of the other of said pair of driving axle assemblies, a pair of engine assemblies mounted and governed to operate at different rates of speeds, power transmission means operatively connecting each of said pair of engine assemblies with one only of the gear reduction mechanisms of said pair of driving axle assemblies, and free-wheeling mechanism mounted to form a portion of said power transmission means operatively connecting the reduction gear mechanism having the slower driving speed ratio with one of said pair of engine assemblies to permit said engine assembly, operatively connected with the reduction gear mechanism having the slower driving speed ratio, to operate without exerting a driving effort, relative to said reduction gear mechanism having the slower driving speed ratio, when the vehicle has attained a predetermined road speed.

15. In a vehicle provided with a main frame member extending longitudinally at the longitudinal center of the vehicle, the combination of a pair of engines mounted on opposite sides of said main frame member, a pair of driving axles operatively connected with said main frame member, power transmission means operatively connecting each of said engines with one only of said driving axles, brake mechanisms operatively connected with each of said power transmission means, shaft means extending through and movably supported by said main frame member, said shaft means being operatively connected with said brake mechanisms, a lever member on said shaft means, and means for operating said shaft to operate said brake mechanism, said last mentioned means being operatively connected with said lever member.

HUGH JOSEPH DILLON.